US010324291B2

(12) United States Patent
Robbins et al.

(10) Patent No.: US 10,324,291 B2
(45) Date of Patent: Jun. 18, 2019

(54) DISPLAY ACTIVE ALIGNMENT SYSTEM FOR WAVEGUIDE DISPLAYS

(71) Applicant: Microsoft Technology Licensing, LLC, Redmond, WA (US)

(72) Inventors: Steven John Robbins, Redmond, WA (US); Drew Edward Steedly, Woodinville, WA (US); Michael Edward Samples, Redmond, WA (US); Zhiqiang Liu, Redmond, WA (US); Andrew K. Juenger, Woodinville, WA (US)

(73) Assignee: Microsoft Technology Licensing, LLC, Remond, WA (US)

( * ) Notice: Subject to any disclaimer, the term of this patent is extended or adjusted under 35 U.S.C. 154(b) by 186 days.

(21) Appl. No.: 15/263,212

(22) Filed: Sep. 12, 2016

(65) Prior Publication Data
US 2018/0074317 A1    Mar. 15, 2018

(51) Int. Cl.
| | |
|---|---|
| *G02B 27/01* | (2006.01) |
| *G02B 6/00* | (2006.01) |
| *G02B 6/10* | (2006.01) |
| *G06T 7/70* | (2017.01) |
| *F21V 8/00* | (2006.01) |

(Continued)

(52) U.S. Cl.
CPC ....... *G02B 27/0172* (2013.01); *G02B 6/0016* (2013.01); *G02B 6/0075* (2013.01); *G02B 6/0078* (2013.01); *G02B 27/017* (2013.01); *G06T 7/74* (2017.01); *G09G 3/003* (2013.01); *G02B 6/00* (2013.01); *G02B 2027/014* (2013.01); *G02B 2027/0112* (2013.01); *G02B 2027/0178* (2013.01); *G02B 2027/0187* (2013.01); *G06T 3/00* (2013.01); *G06T 2207/20221* (2013.01); *G09G 2320/0666* (2013.01); *G09G 2320/0693* (2013.01); *G09G 2330/12* (2013.01); *G09G 2340/0464* (2013.01); *G09G 2356/00* (2013.01); *G09G 2360/145* (2013.01)

(58) Field of Classification Search
None
See application file for complete search history.

(56) References Cited

U.S. PATENT DOCUMENTS

| | | |
|---|---|---|
| 8,629,815 B2 | 1/2014 | Brin et al. |
| 8,970,571 B1 | 3/2015 | Wong et al. |

(Continued)

FOREIGN PATENT DOCUMENTS

WO    2016046514 A1    3/2016

OTHER PUBLICATIONS

"International Search Report and the Written Opinion cited in PCT Application No. PCT/US2017/050149 dated Nov. 21, 2017 (Copy Attached)."

(Continued)

*Primary Examiner* — Michelle R Connelly
(74) *Attorney, Agent, or Firm* — Workman Nydegger

(57) ABSTRACT

A display system includes a display alignment tracker configured track the position of a first signal and the position of a second signal. The display alignment tracker optically multiplexes a portion of a first signal and a portion of the second signal into a combined optical signal and measures a differential between the first signal and the second signal.

12 Claims, 14 Drawing Sheets

(51) Int. Cl.
  *G09G 3/00* (2006.01)
  *G06T 7/73* (2017.01)
  *G06T 3/00* (2006.01)

(56) References Cited

U.S. PATENT DOCUMENTS

| | | |
|---|---|---|
| 9,164,290 B2 | 10/2015 | Robbins et al. |
| 2003/0219147 A1 | 11/2003 | Nishiura |
| 2005/0174651 A1 | 8/2005 | Spitzer et al. |
| 2006/0092257 A1 | 5/2006 | Dejong et al. |
| 2009/0027375 A1 | 1/2009 | Ryu et al. |
| 2009/0153437 A1 | 6/2009 | Aharoni |
| 2009/0153796 A1 | 6/2009 | Rabner |
| 2009/0153976 A1 | 6/2009 | Dolgoff |
| 2010/0302276 A1* | 12/2010 | Levola .......... G06F 3/1431 345/649 |
| 2011/0080401 A1 | 4/2011 | Tan et al. |
| 2013/0044376 A1 | 2/2013 | Valera et al. |
| 2013/0077049 A1 | 3/2013 | Bohn |
| 2013/0215235 A1 | 8/2013 | Russell |
| 2013/0329053 A1 | 12/2013 | Jones et al. |
| 2014/0064605 A1 | 3/2014 | Komoriya et al. |
| 2014/0098076 A1 | 4/2014 | Yoon |
| 2014/0146394 A1 | 5/2014 | Tout et al. |
| 2014/0327970 A1 | 11/2014 | Bohn et al. |
| 2014/0375681 A1 | 12/2014 | Robbins et al. |
| 2015/0035744 A1 | 2/2015 | Robbins et al. |
| 2015/0160529 A1 | 6/2015 | Popovich et al. |
| 2015/0243068 A1 | 8/2015 | Solomon |
| 2015/0269784 A1 | 9/2015 | Miyawaki et al. |
| 2016/0012643 A1 | 1/2016 | Kezele et al. |
| 2016/0156900 A1 | 6/2016 | Aruga |
| 2017/0052423 A1* | 2/2017 | Okamoto ............. G02F 1/225 |
| 2017/0123214 A1* | 5/2017 | Ikegami ........... G02B 27/0172 |
| 2018/0074578 A1 | 3/2018 | Robbins et al. |

OTHER PUBLICATIONS

International Search Report and the Written Opinion cited in PCT Application No. PCT/US2017/050150 dated Nov. 24, 2017 (Copy Attached).

"Non Final Office Action Issued in U.S. Appl. No. 15/263,220", dated May 7, 2018, 27 Pages.

Han, et al., "Portable waveguide display system with a large field of view by integrating freeform elements and volume holograms", In Journal of Optics Express, vol. 23, Issue 3, Feb. 4, 2015, pp. 3534-3549.

* cited by examiner

DISPLAY ACTIVE ALIGNMENT SYSTEM FOR WAVEGUIDE DISPLAYS

CROSS-REFERENCE TO RELATED APPLICATIONS

N/A

BACKGROUND

Background and Relevant Art

Computers and computing systems have affected nearly every aspect of modern living. Computers are generally involved in work, recreation, healthcare, transportation, entertainment, household management, etc. Computers commonly present information to a user in a visual manner. The presentation of visual information to users can be performed through a variety of technologies. Conventional monitors and screens present visual information to users on a flat surface in the user's environment, such as a desktop monitor, a smartphone screen, or a laptop display.

Virtual reality systems present visual information to users with a head-mounted display, which incorporates one or more motion and/or position sensors to simulate an artificial visual environment. Virtual reality systems present visual information as the environment. To replicate a visual environment, the virtual reality system can present different visual information on a plurality of visual channels, such different visual information to left and right eyes.

Augmented or mixed reality system present visual information to users with a head-mounted display by overlaying and/or integrating the visual information with the user's ambient environment. For example, a mixed reality system may present visual information in the form of a simulated object on a table surface. To accurately represent the position of the simulated object to the user, separate visual signals are presented to the user to create a depth of field of the simulated object and allow the user to perceive the position of the object in space.

The accurate simulation of one or more objects in a user's ambient environment relies upon the relative position of the first signal (i.e., the visual information presented to the user's left eye) and the second signal (i.e., the visual information presented to the user's right eye). Precise identification of alignment and/or displacement of the different visual signals presented to a user is, therefore, desirable.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed systems are configured for rendering optical signals on head-mounted displays. Some of the disclosed systems include a first waveguide configured to guide a first signal, a second waveguide configured to guide a second signal, and an optical multiplexer in optical communication with the first waveguide and the second waveguide. The optical multiplexer is configured to combine at least a portion of the first signal and at least a portion of the second signal. An optical sensor, in optical communication with the optical multiplexer, is configured to receive a combined optical signal including at least a portion of the first signal and at least a portion of second signal.

Disclosed embodiments also include methods for optically multiplexing optical signals from two separate waveguides mounted to a head-mounted display. These methods include sampling a first signal from a first waveguide mounted to a first side of the head-mounted display, sampling a second signal from a second waveguide mounted to a second side of the head-mounted display, and optically multiplexing at least a portion of the first signal and at least a portion of the second signal with an optical multiplexer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for detecting alignment of visual information. More particularly, the present disclosure relates to measuring a difference between a first visual signal and a second visual signal in a head-mounted device. The present disclosure also relates to the measurement and compensation of physical displacement or other differences (e.g., color) between a first visual signal and a second visual signal relative to one another.

The following discussion refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 1:
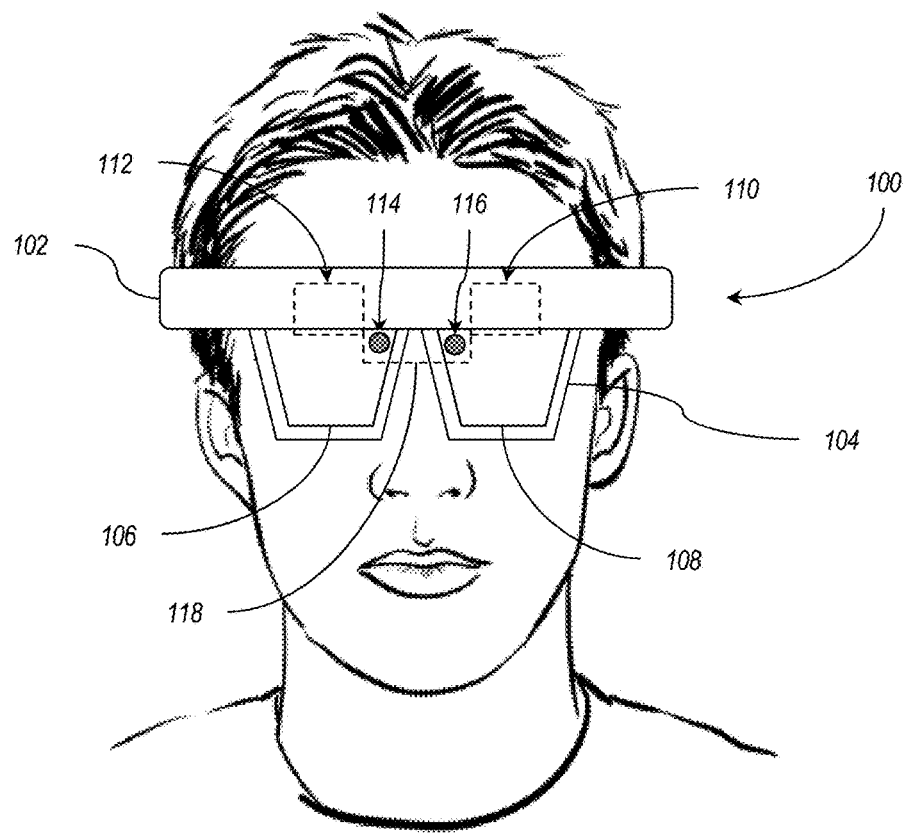
FIG. 1 is a schematic front view of an embodiment of a head-mounted display system.

Referring now to FIG. 1, an embodiment of a display system 100 is illustrated. In some embodiments, the display system 100 is a head-mounted display, as shown in FIG. 1. In other embodiments, a display system according to the present disclosure may be any display system that presents a plurality of visual signals to a user. The display system 100 of FIG. 1 has a body 102 that supports a frame 104 with a first waveguide 106 and a second waveguide 108 therein.

The body 102 also houses and/or supports one or more computer components in communication with one another, such as processors, data storage devices, communication devices, memory devices, power supplies, other computer components, or combinations thereof. For example, the body 102 may support one or more processors in communication with a data storage device having instructions stored thereon that the one or more processors may execute to perform the methods of the disclosed invention.

The frame 104 supports at least a first waveguide 106 and a second waveguide 108. The first waveguide 106 and second waveguide 108 are positioned to direct visual information to a user, such as being positioned in front of the user's eyes. In at least one embodiment, the first waveguide 106 is positioned in front of the user's left eye and the second waveguide 108 is positioned in front of the user's right eye.

The first waveguide 106 and the second waveguide 108 are in optical communication with a first display module assembly (DMA) 110 and a second DMA 112, respectively. The first DMA 110 provides visual information to the first waveguide 106 and the second DMA 112 provides visual information to the second waveguide 108. The DMA emits light that is collimated and angularly encoded such that the center of a pixel on the microdisplay equates to a specific angle in space. The exact angles are defined by the focal length and distortion of the DMA collimating lens and also other intrinsic characteristics of the system, such the orientation of the microdisplay and fold mirrors within the DMA. A first signal is provided to the first waveguide 106, for example, by the first DMA 110. A second signal is provided to the second waveguide 108, for example, by the second DMA 112. Discrepancies between an azimuth angle, elevation angle, or roll angle of the first signal provided by the first DMA 110 and the azimuth angle, elevation angle, or roll angle of the second signal provided by the second DMA 112 may appear to a user as misalignments of images in the first signal and second signal.

In other embodiments, the display system 100 may have a single DMA that is in optical communication with both the first waveguide 106 and the second waveguide 108. In such an alternative embodiment, the single DMA transmits separate signals to the separate waveguides.

The first signal propagates through the first waveguide 106 by internal reflection within the first waveguide 106. The second signal propagates through the second waveguide 108 by internal reflection with the second waveguide 108. In some embodiments, the first waveguide 106 and/or the second waveguide 108 is a single optically transmissive layer. For example, the first waveguide 106 and/or second waveguide 108 may be a single layer of glass. In other embodiments, the first waveguide 106 and/or the second waveguide 108 comprises a stack of waveguides. For example, the first waveguide 106 and/or the second waveguide 108 may be a stack of waveguides wherein each of the waveguides is configured to propagate a particular range of wavelengths within that waveguide of the waveguide stack.

The first waveguide 106 and second waveguide 108 each include a diffraction optical element (DOE) positioned on the waveguide to outcouple visual information from the waveguide. In some embodiments, a DOE is positioned on the nasal edge (e.g., near the nose of the user) of the first waveguide 106 and/or the second waveguide 108. In other embodiments, a DOE is positioned along a top edge of the first waveguide 106 and/or the second waveguide 108. In at least one embodiment, each of the first waveguide 106 and the second waveguide 108 includes a separate DOE positioned at or near the top of the nasal side of the first waveguide 106 and the second waveguide 108, respectively, shown in FIG. 1 as DOE 114 and 116. The first DOE 114 samples the first signal of the first waveguide 106 and the second DOE 116 samples the second signal of the second waveguide 108.

Figure 2:
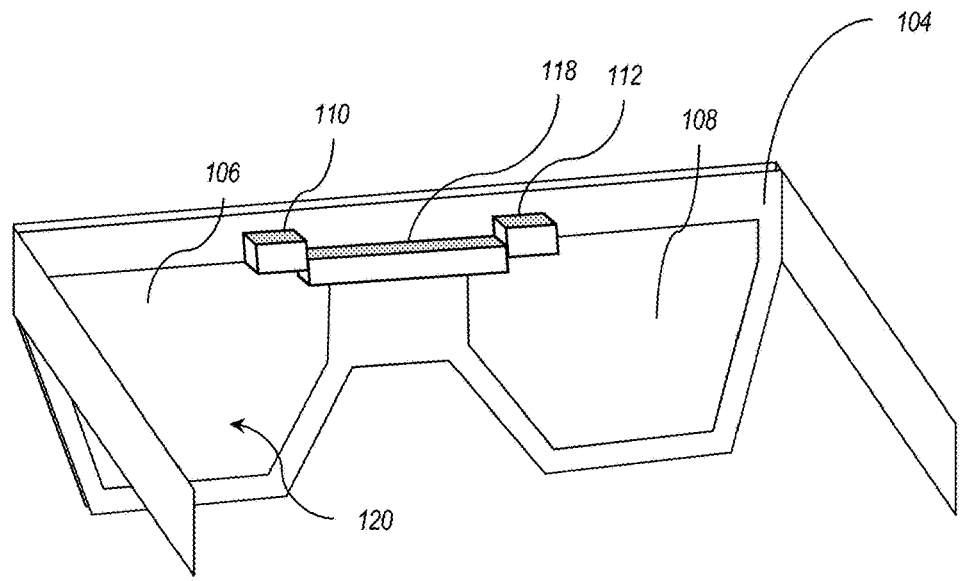
FIG. 2 is a rear perspective view of an embodiment of a frame of the display system of FIG. 1.

As shown in FIG. 2, a display alignment tracking (DAT) sensor 118 is positioned proximate an output surface 120 of the first waveguide 106 and the second waveguide 108. The input surface of the first waveguide 106 and the second waveguide 108 faces away from the user and receives ambient light from the user's environment. The first waveguide 106 and the second waveguide 108 mix the ambient light with the first signal and the second signal to provide mixed reality visual information to a user viewing the mixed reality visual information proximate the output surface 120 of the first waveguide 106 and/or the second waveguide 108.

The DAT sensor 118 is positioned on the output surface 120 (e.g., the user viewing side of the display system 100).

Accordingly, the DAT sensor 118 receives the first signal and second signal from the first waveguide 106 and the second waveguide 108 from the output surface 120 as the user also views the first signal and the second signal from the output surface 120. In some embodiments, the DAT sensor 118 is supported by the frame 104. In other embodiments, the DAT sensor is integrated into the frame 104. In yet other embodiments, the DAT sensor 118 is positioned adjacent the frame 104 and is supported by a body of the display system 100.

Figure 3:
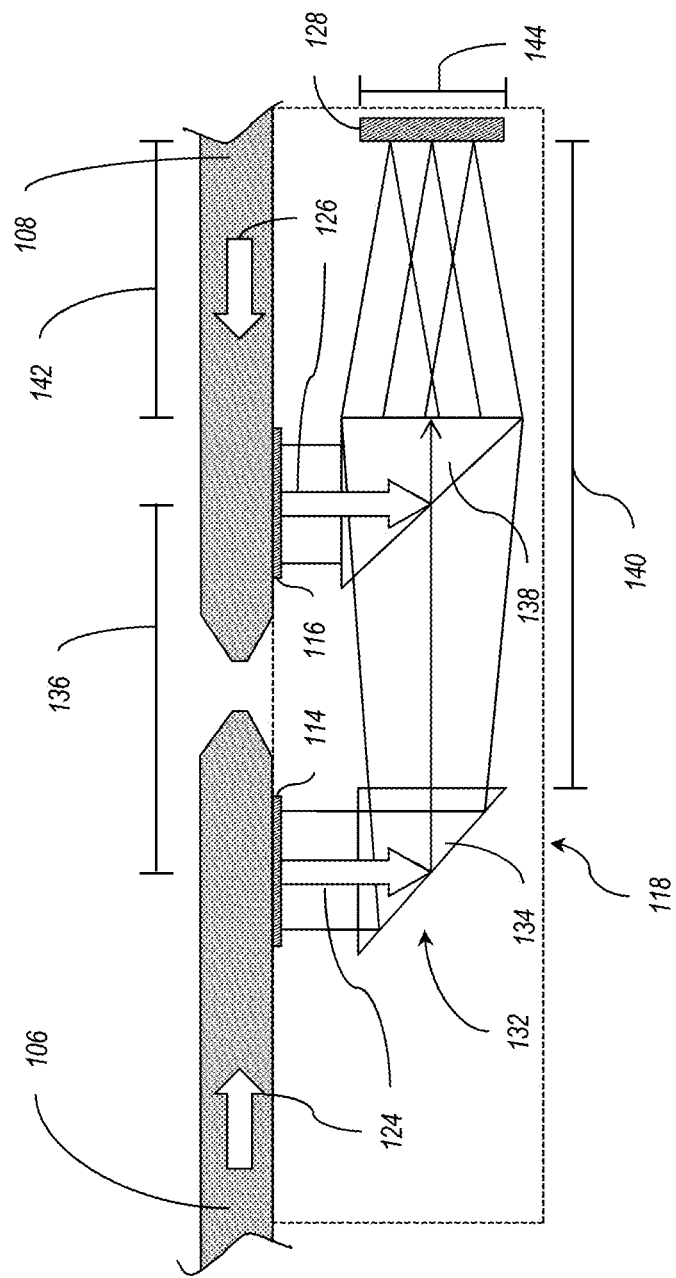
FIG. 3 is a top schematic view of an embodiment of a display alignment system of the display system of FIG. 1.

FIG. 3 illustrates a top partial cross-sectional view of the nasal sides of the first waveguide 106 and the second waveguide 108 with the DAT sensor 118 positioned adjacent the output surface 120 of the first waveguide 106 and the second waveguide 108. The first signal 124 and the second signal 126 propagate through the first waveguide 106 and the second waveguide 108, respectively, and the first DOE 114 and the second DOE 116 outcouple the first signal 124 and the second signal 126, respectively.

The DAT sensor 118 includes an optical sensor 128 that is configured to receive a combined optical signal 130 of the first signal 124 and second signal 126. The DAT sensor 118 includes an optical multiplexer 132 that multiplexes the first signal 124 and the second signal 126. The optical multiplexer 132 combines the first signal 124 and second signal 126 with any appropriate optical hardware. In some embodiments, for example, the optical multiplexer includes at least a first prism 134 and a second prism 138 that multiplex the received signals by refracting both of the signals towards a common optical sensor. In other embodiments, the optical multiplexer 132 includes one or more fiber optic members to combine the first signal 124 and second signal 128. In yet other embodiments, the optical multiplexer 132 comprises a combination of one or more prisms, fiber optic members, mirrors, and/or lenses. For example, an optical multiplexer 132 may direct a first signal 124 from the first DOE 114 to the first prism 134 by one or more fiber optic members. In another example, the optical multiplexer 132 may direct the first signal 124 from the first prism 134 to the second prism 138 by one or more fiber optic members. The optical multiplexer 132 directs the first signal 124 from the first prism 134 to the second prism 138 through an optical medium, such as glass or one or more fiber optic members, to introduce the first signal 124 into the second prism 138 without refraction occurring at the first interface of the second prism.

In some embodiments, the optical sensor 128 may be a single pixel optical sensor. For example, the optical sensor may detect a periodic structure presented in a certain phase through an aperture, and the optical sensor may sense the integrated power of the periodic structure. In other embodiments, the optical sensor 128 includes a plurality of photoreceptors in a photoreceptor array. For example, the optical sensor 128 may be an imaging sensor. In some embodiments, the optical sensor 128 is a charge coupled device (CCD). In other embodiments, the optical sensor 128 is a complimentary metal-oxide sensor (CMOS).

In some embodiments, the optical sensor 128 includes a plurality of channels on which different colors may be received. For example, the optical sensor 128 may have red, green, and blue channels or yellow, cyan, and magenta channels (i.e., configured to detect and/or record light in red, green, and blue wavelengths or yellow, cyan, and magenta wavelengths). In other examples, the optical sensor 128 may have visible wavelength channels and infrared wavelength channels. In other embodiments, the optical sensor 128 has a photoreceptor array that is configured to receive signal on a single channel. For example, the optical sensor 128 may have a blue channel. In other examples, the optical sensor 128 may have an infrared channel configured to receive light in infrared wavelengths.

In some embodiments, positioning of the DAT sensor 118 is at least partially dependent on a displacement 136 of the first DOE 114 and second DOE 116. The displacement 136 may be in a range having an upper value, a lower value, or an upper and lower value including any of 3 millimeters (mm), 4 mm, 5 mm, 6 mm, 7 mm, 8 mm, 9 mm, 10 mm, 11 mm, 12 mm, 13 mm, 14 mm, 15 mm, or any values therebetween. In some instances, the displacement 136 is greater than 3 mm. In other instances, the displacement 136 is less than 15 mm. In yet other instances, the displacement 136 is within a range of between about 3 mm and about 15 mm and even more preferably within a range of between about 5 mm and about 12 mm. In at least one example, the displacement 136 is at or about 9 mm.

The DAT sensor 118 includes a first prism 134 and a second prism 138. In some instances, the spacing between the first prism 134 and the second prism 138 is equivalent to the displacement 136 of the first DOE 114 and second DOE 116. In other embodiments, the spacing between the first prism 134 and the second prism 138 is more than displacement 136 or less than displacement 136. For example, the first signal 124 and/or second signal 126 may exit the first waveguide 106 and/or second waveguide 108 at a non-perpendicular angle. The first prism 134 and second prism 138, therefore, are positioned to receive the first signal 124 and second signal 126, respectively, as the first signal 124 and second signal 126 are outcoupled from the first waveguide 106 and second waveguide 108 by the first DOE 114 and second DOE 116.

The first prism 134 refracts the first signal 124 at any angle such that the first signal 124 is directed toward the second prism 138. For example, the first prism 134 may refract the light at an angle in a range having an upper value, a lower value, or an upper and lower value including any of 45°, 60°, 75°, 90°, 105°, 120°, 135°, or any values therebetween. In some instances, the first prism 134 refracts the light at an angle greater than 45°. In other instances, the first prism 134 refracts the light at an angle less than 135°. In yet other instances, the first prism 134 refracts the light in a range between about 45° and about 135° and, even more particularly, within a range of between about 75° and about 105°. In at least one example, the first prism 134 refracts the light at or about 90°.

The second prism 138 refracts the second signal 126 and transmits the first signal 124 through the second prism 138 such that a combined optical signal 130 is directed at and received by the optical sensor 128. In some embodiments, the first prism 134 is positioned a first prism distance 140 from the optical sensor 128. The first prism distance 140 may be in a range having an upper value, a lower value, or an upper and lower value including any of 15 mm, 17 mm, 19 mm, 20 mm, 21 mm, 22 mm, 23 mm, 24 mm, 25 mm, 26 mm, 27 mm, 28 mm, 29 mm, 30 mm, or any values therebetween. In some instances, the first prism distance 140 is greater than 15 mm. In other instances, the first prism distance 140 is less than 30 mm. In yet other examples, the first prism distance 140 is within a range between about 15 mm and about 30 mm and even more particularly between about 20 mm and about 26 mm. In at least one example, the first prism distance 140 is at or about 24 mm.

In some embodiments, the second prism 138 is positioned a second prism distance 142 from the optical sensor 128. The second prism distance 142 may be in a range having an upper value, a lower value, or an upper and lower value including any of 5 mm, 6 mm, 7 mm, 8 mm, 9 mm, 10 mm, 11 mm, 12 mm, 13 mm, 14 mm, 15 mm, any values therebetween. In some instances, the second prism distance 142 is greater than 5 mm. In other examples, the second prism distance 142 is less than 15 mm. In yet other examples, the second prism distance 142 is in a range between about 5 mm and about 15 mm and even more preferably between about 7 mm and about 13 mm. In at least one example, the second prism distance 142 is at or about 10 mm.

To capture and/or sample at least a portion of the combined optical signal 130, the optical sensor 128 may have a sensor width 144 in a range having an upper value, a lower value, or upper and lower values including any of 1 mm, 2 mm, 3 mm, 4 mm, 5 mm, 6 mm, 7 mm, 8 mm, 9 mm, 10 mm, or any values therebetween. In some instances, the sensor width 144 is greater than about 1 mm. In other examples, the sensor width 144 is less than about 10 mm. In yet other examples, the sensor width 144 is in a range between about 1 mm and about 10 mm. In further examples, the sensor width 144 is in a range between about 3 mm and about 7 mm. In at least one example, the sensor width 144 is at or about 5 mm.

The DAT sensor, according to the present disclosure, is operable to sample any desired portion of the combined optical signal, which may include any portion of the first signal and the second signal. As noted above, the first signal and second signal are generated by the first DMA and the second DMA, respectively. For instance, the first DMA and second DMA generate the first signal and second signal, respectively, using a display pixel array, such as a liquid crystal on silicon (LCOS) pixel array in each of the first DMA and the second DMA.

An example display pixel array 146 and associated signal is shown in FIG. 4 through FIG. 7. The display pixel array 146 has a plurality of pixels in an active region 148 used to generate visual information intended for a user and a plurality of pixels in a border region 150 that are intended to provide a buffer of pixel space. The border region 150 allows a DMA to move the active region 148 to accommodate and/or compensate for misalignments in the mechanical construction of the display system.

Figure 4:
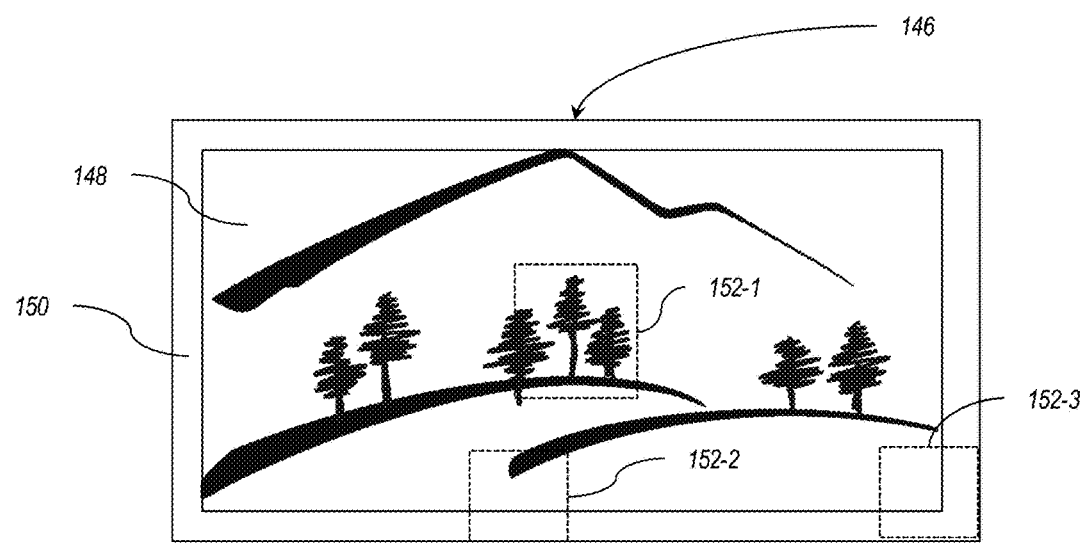
FIG. 4 is a schematic representation of embodiments of sampling regions of a display pixel array.

FIG. 4 illustrates an embodiment of a display pixel array 146 with examples of various sampling regions overlaid upon the display pixel array 146. A sampling region is the portion of the signal sampled and/or imaged by the DAT sensor. For example, the DAT sensor may be configured to sample only a portion of the signal provided to the DAT sensor. As shown in FIG. 4, the DAT sensor may sample a sampling region 152 (i.e., 152-1, 152-2 and/or 152-3) of the combined optical signal without any additional test pattern being imposed on the images to detected alignment between the first signal portion of the combined optical signal and the second signal portion of the combined optical signal, as disclosed in more detail below.

In some embodiments, the sampling region 152-1 is entirely within the active region 148 of the signal from the display pixel array 146, in which case the image contained in the signal is sampled and used to detect alignment and/or other signal attributes. In other embodiments, the sampling region 152-2 is partially within the active region 148 and partially within the border region 150, exposing a single edge/border of the active region that is usable to detect alignment between the sampled signal. In yet other embodiments, the sampling region 152-3 is partially within the active region 148 and partially within the border region 150, exposing at least two edges/borders of the active region (e.g., both a horizontal edge and a vertical edge of the active region 148) that are visible within the sampling region 152-3, and such that both edges/borders are usable to detect alignment of the sampled signal.

Figure 5:
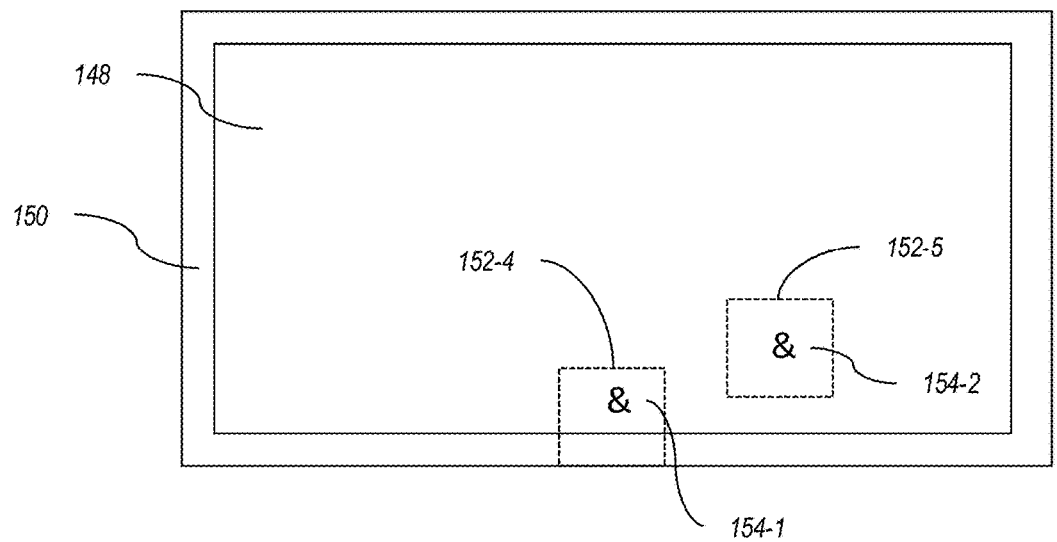
FIG. 5 is a schematic representation of embodiments of sampling regions including test patterns of a display pixel array.

In some embodiments, the first signal and second signal also include a test pattern that allows for the DAT sensor to search for alignment of the test pattern of the first signal and second signal. As shown in FIG. 5, the test pattern 154-1 may be within the active region 148 of the signal from the display pixel array 146. The sampling region 152-4 may sample the active region 148 with the test pattern 154-1 and at least a portion of the border region 150. In other embodiments, a sampling region 152-5 samples the region 148, including a test pattern 154-2, without sampling the border region 150.

Figure 6:
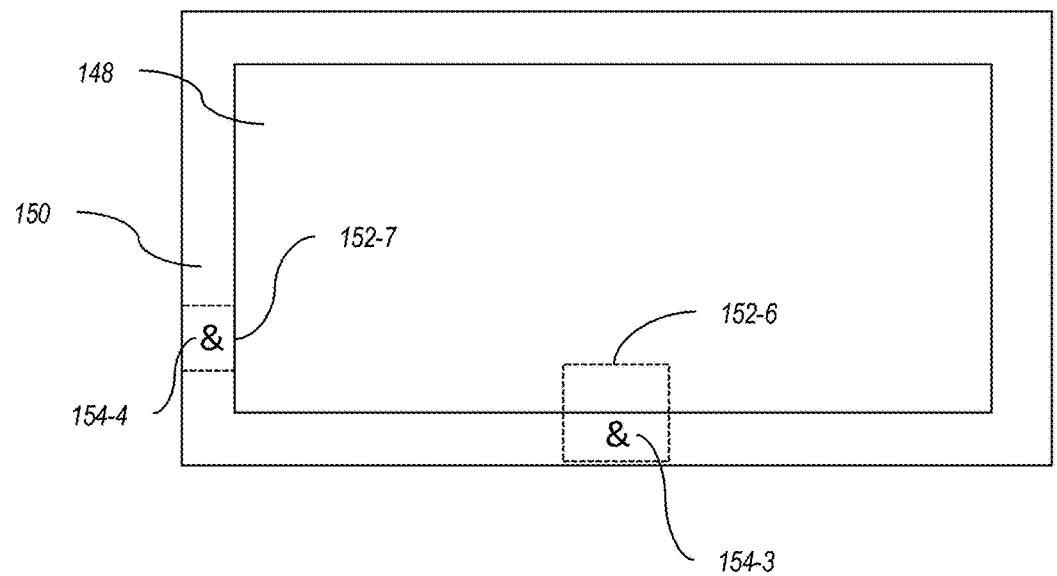
FIG. 6 is a schematic representation of other embodiments of sampling regions including test patterns of a display pixel array.
Figure 7:
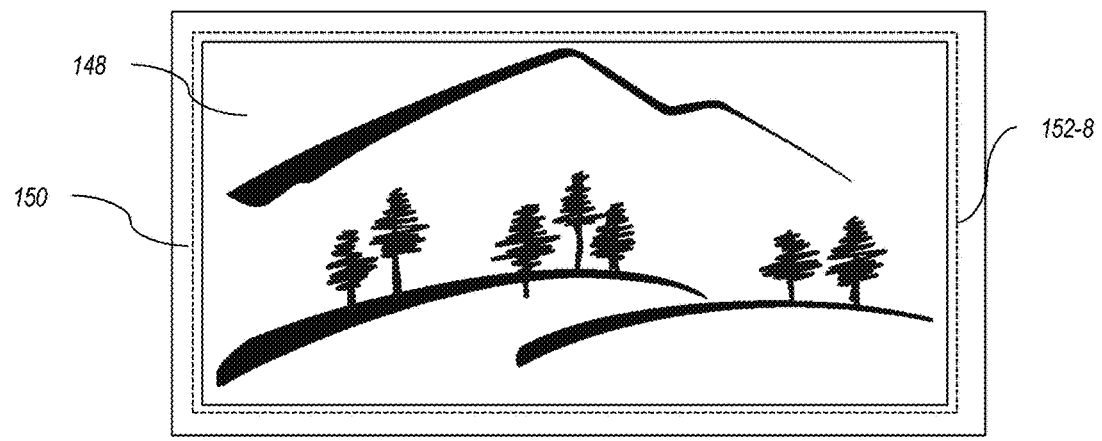
FIG. 7 is a schematic representation of another embodiment of sampling region of a display pixel array

As shown in FIG. 6, a test pattern 154-3, 154-4 may be located in the border region 150. For example, a test pattern 154-3 is shown in the border region 150 with a sampling region 152-6 located to sample the border region 150, the active region 148, the test pattern 154-3, and the boundary between the active region 148 and the border region 150. In another example, a test pattern 154-4 is positioned in the border region 150 and the sampling region 152-7 is positioned to sample the test pattern 154-4 and border region 150 without sampling the active region 148. In at least one embodiment, a sampling region 152-8 includes all of the active region 148, as shown in FIG. 7. The sampling region 152-8 may include at least a portion of the border region 150 or may include no part of the border region 150.

Figure 8:
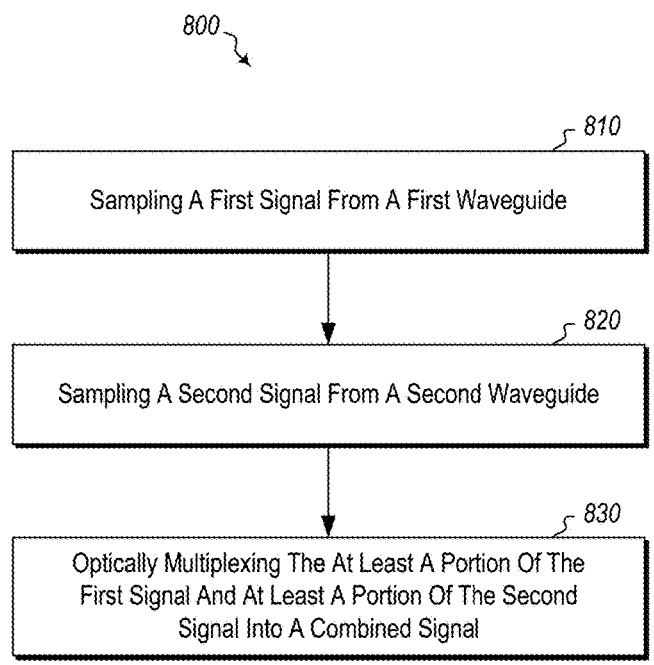
FIG. 8 is a flowchart illustrating an embodiment of a method of optically multiplexing a portion of a first signal and a portion of a second signal.

FIG. 8 illustrates a flowchart 800 corresponding to methods for optically multiplexing optical signals from two separate waveguides mounted to a head-mounted display. As reflected, these methods include sampling a first signal from a first waveguide (810), sampling a second signal from a second waveguide (820), and optically multiplexing at least a portion of the first signal and at least a portion of the second signal to create a combined optical signal (830).

In some embodiments, the first signal is sampled with a first DOE positioned on the first waveguide and the second signal is sampled with a second DOE positioned on the second waveguide. The optical multiplexer may include a prism assembly, a fiber optic assembly, or other optical assembly to combine and/or overlay at least a portion of the first signal and at least a portion of the second signal. The optical multiplexer may direct the combined optical signal to an optical sensor to image the combined optical signal.

The first signal and second signal may be generated by a display pixel array and/or a DMA, as described herein. Sampling the first signal and sampling the second signal may include using a sampling region that includes an active region, a border region, or a combination thereof, as shown in relation to FIG. 4 through FIG. 7. In some embodiments, the sampling region used in sampling 158 the first signal and sampling the second signal includes a test pattern.

Figure 9:
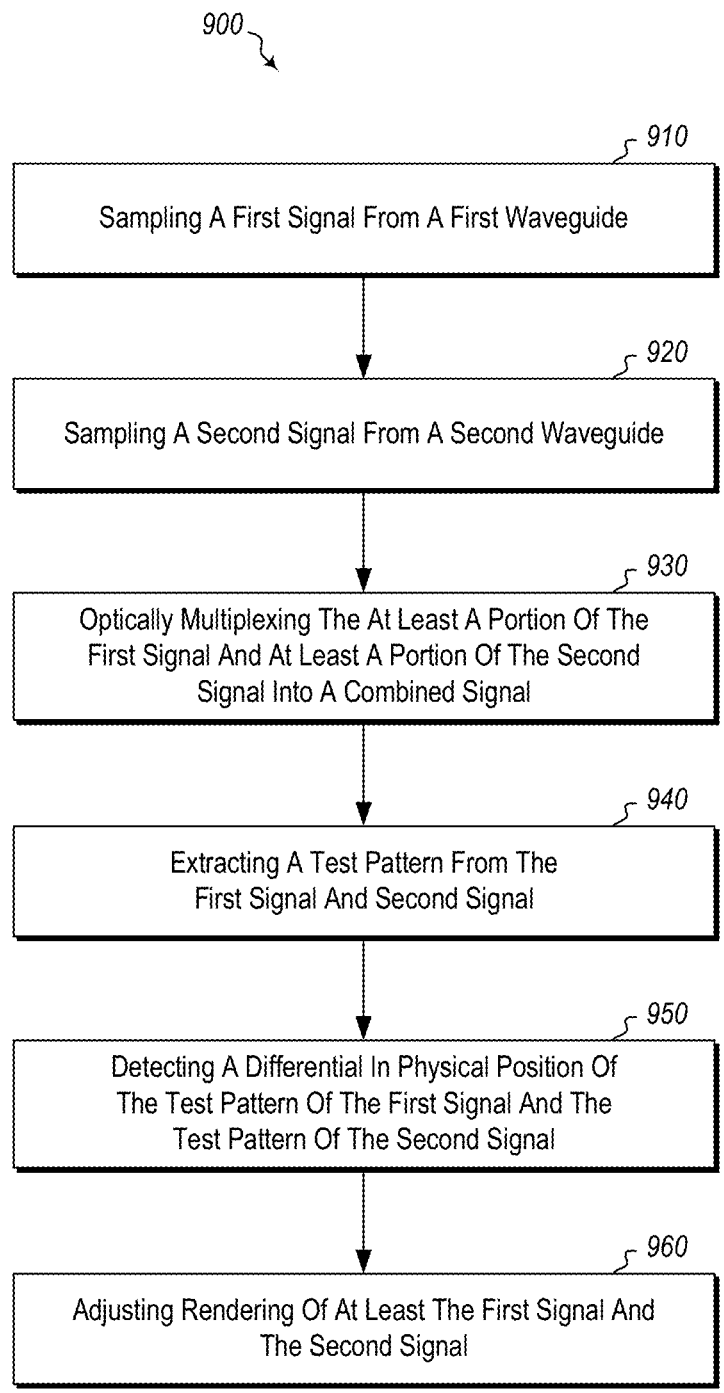
FIG. 9 is a flowchart illustrating an embodiment of a method of adjusting a portion of a first signal and a portion of a second signal in response to calculating a differential.

FIG. 9 illustrates another flowchart 900 that corresponds to other related methods for adjusting visual information based on optically multiplexing optical signals from two separate waveguides mounted to a head-mounted display, which is related to the methods described in relation to the FIG. 8. For example, the flowchart 900 illustrates how the disclosed methods include sampling a first signal from a first waveguide (910), sampling a second signal from a second waveguide (920), and optically multiplexing at least a portion of the first signal and at least a portion of the second signal to create a combined optical signal (930) and then extracting a test pattern from the first signal and the second signal (940). In some embodiments, the test pattern is located in an active region of the first signal and second signal. In other embodiments, the test pattern is located in a border region of the first signal and second signal. In yet other embodiments, the test pattern is located at least partially in the border region and at least partially in the active region of the first signal and second signal.

The flowchart 900 also includes acts of detecting a differential between the first signal and the second signal in at least a physical position associated with a first rendering location of the test pattern extracted from the first signal and a second rendering location of the test pattern extracted from the second signal (950) and adjusting rendering of at least the first signal and the second signal to at least partially compensate for the detected differential (960).

In some embodiments, the detection of a differential between the first signal and the second signal includes comparing a first coordinate value of the first rendering location of the test pattern extracted from the first signal and a second coordinate value of the second rendering location of the test pattern extracted from the second signal. For example, the first coordinate value may have an azimuth value, an elevation value, and a roll value within the first signal and the second coordinate value may have an azimuth value, an elevation value, and a roll value within the second signal. In an embodiment in which there is negligible or no displacement between the first signal and the second signal, the first coordinate value and second coordinate value will be equivalent. In other embodiments, the first coordinate value and second coordinate value differ in at least one of the azimuth value, elevation value, or roll value.

A coordinate value differential between the first signal and second signal may indicate a displacement of the first signal in the first waveguide relative to the second signal in the second waveguide. This displacement can be measured and used to adjust presentation of the first or second signal, to thereby improve alignment of the signals, as described in more detail below. In other embodiments, the DAT sensor detects an absolute differential, such as a linear distance differential between the perceived first signal and second signal.

In some embodiments, the detection of a differential between the first signal and the second signal includes comparing a first dimensional value of the first rendering location of the test pattern extracted from the first signal and a second dimensional value of the second rendering location of the test pattern extracted from the second signal. The dimensional value of the test pattern preferably includes a combination of the x-displacement and y-displacement of the test pattern in the signal (although it may also be limited to only the x-displacement or y-displacement of the test pattern).

When the dimensional value includes a combination of the x-displacement and y-displacement, the first dimensional value may have an azimuth value, an elevation value, and a roll value within the first signal and the second coordinate value may have an azimuth value, an elevation value, and a roll value within the second signal. In an embodiment in which there is no displacement between the first signal and the second signal, the first dimensional value and second dimensional value are equivalent. In other embodiments, the first dimensional value and second dimensional value differ in at least one of the azimuth value, elevation value, and roll value. A dimensional differential in the test pattern between the first signal and second signal may indicate a distortion in the first signal in the first waveguide relative to the second signal in the second waveguide.

In some embodiments, adjusting rendering of at least the first signal and the second signal (960) is based at least partially on the detected differential. For example, a coordinate differential in the test pattern is used to displace the first signal in azimuth, elevation, or roll such that the coordinate value of the first rendering location of the test pattern extracted from the first signal and the coordinate value of the second rendering location of the test pattern extracted from the second signal are equivalent. In another example, a dimensional differential in the test pattern is used to stretch the first signal in the azimuth, elevation, or roll such that the dimensional value of the first rendering location of the test pattern extracted from the first signal and the dimensional value of the second rendering location of the test pattern extracted from the second signal are equivalent.

In some embodiments, the test pattern is a test pattern imposed on the first signal and second signal. In other embodiments, the test pattern is a sampling region of the first signal and second signal in which a portion of the active region, a portion of the border region, a boundary between the active region and the border region, or combinations thereof is the test pattern.

Figure 10:
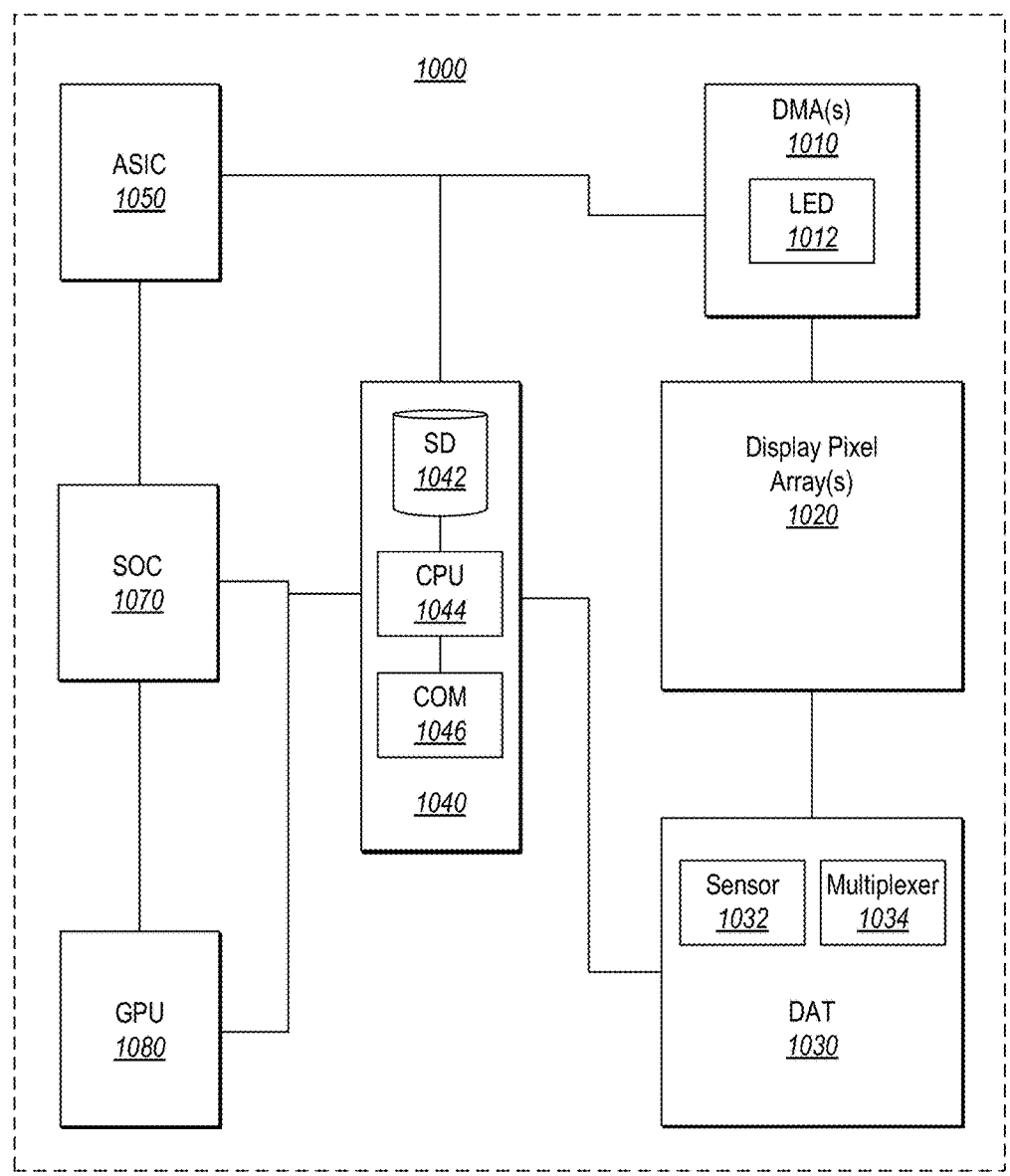
FIG. 10 is a schematic representation of an embodiment of a display system.

Attention will now be directed to FIG. 10, which illustrates some of the components that are incorporated within the disclosed display systems for enabling the methods described herein.

FIG. 10 shows a display system 1000 that includes one or more DMA(s) 1010 with corresponding display pixel array(s) 1020 (e.g., 146 of FIG. 4) that generate the first and second signals, respectively, as previously described above. For the purposes of illustration, the first and second DMA are collectively identified as DMA(s) 1010 and the corresponding display pixel array(s) are identified as element 1020 in FIG. 10. It will be understood that the first and second DMAs and the corresponding display pixel arrays are configured to run in parallel and to communicate in parallel with the DAT 1030, as previously described above in reference to FIG. 3.

The DAT 1030 includes an optical multiplexer 1032 in communication with an image sensor 1034 to receive a combined optical signal from the optical multiplexer 1032. The DAT 1030 is in data communication with other computing components 1040 including at least one CPU 1042 in communication with a data storage device 1044. The data storage device may include physical computer-readable storage media. Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer. In particular, the computer memory may store computer-executable instructions that when executed by one or more processors cause various functions to be performed, such as the acts recited in the embodiments of methods described herein.

In some embodiments, the computing components 1040 further include a communication device 1046. The communication device 178 may include any combination of wired and/or wireless communication hardware and/or software, including a universal serial bus, Ethernet, Bluetooth, Wi-Fi, and/or other wired or wireless communication components.

The DAT 1030 and/or computing components 1040 may determine the differential between the first signal and the second signal. The differential is used to displace and/or stretch the rendering of the first signal and/or the second signal. Data regarding the first and second signals is provided to the corresponding first and second DMAs 1010 by an application-specific integrated circuit (ASIC) 1050.

The ASIC 1050 includes one or more processors that are application specific to one or more functions of the display system 100. For example, one or more processors of the ASIC 1050 may include audio processors, accelerometers, gyroscopes, power management systems, other application-specific processors, or combinations thereof.

A software-on-chip (SOC) 1070 and/or graphical processor unit (GPU) 1080 may calculate information regarding the first and second signals and provide the information to the ASIC 1050, the computing components 1040, or any combination thereof. The ASIC 1050, the computing components 1040, or any combinations thereof may also use the differential calculated by the DAT 1030 and/or computing components 1040 to alter the data prior to the rendering of additional/altered first and second signals. The ASIC 1050, the computing components 1040, or any combinations thereof may then provide the data to the first and second DMAs 1010 to render the corresponding first and second additional/altered signals. The display system 1000, therefore may operate as a feedback loop that samples the first and second signals rendered by the DMAs 1010, calculates a differential between at least a portion of the first signal and at least a portion of the second signal, and uses the differential to adjust the rendering of further frames of the first signal and/or second signal by the first and second DMAs 1010, respectively.

In some embodiments, one or more adjustments to the first signal and/or second signal based on the detected differential between the sampled signals are made in by the computing components 1040. In other embodiments, one or more adjustments to the first signal and/or second signal based on the differential are made in the ASIC 1050. In yet other embodiments, one or more adjustments to the first signal and/or second signal based on the differential are made in the GPU 1080.

Attention will now be directed to some of the disclosed methods for calibrating the first and second signals based on the sampling described above.

Figure 11:
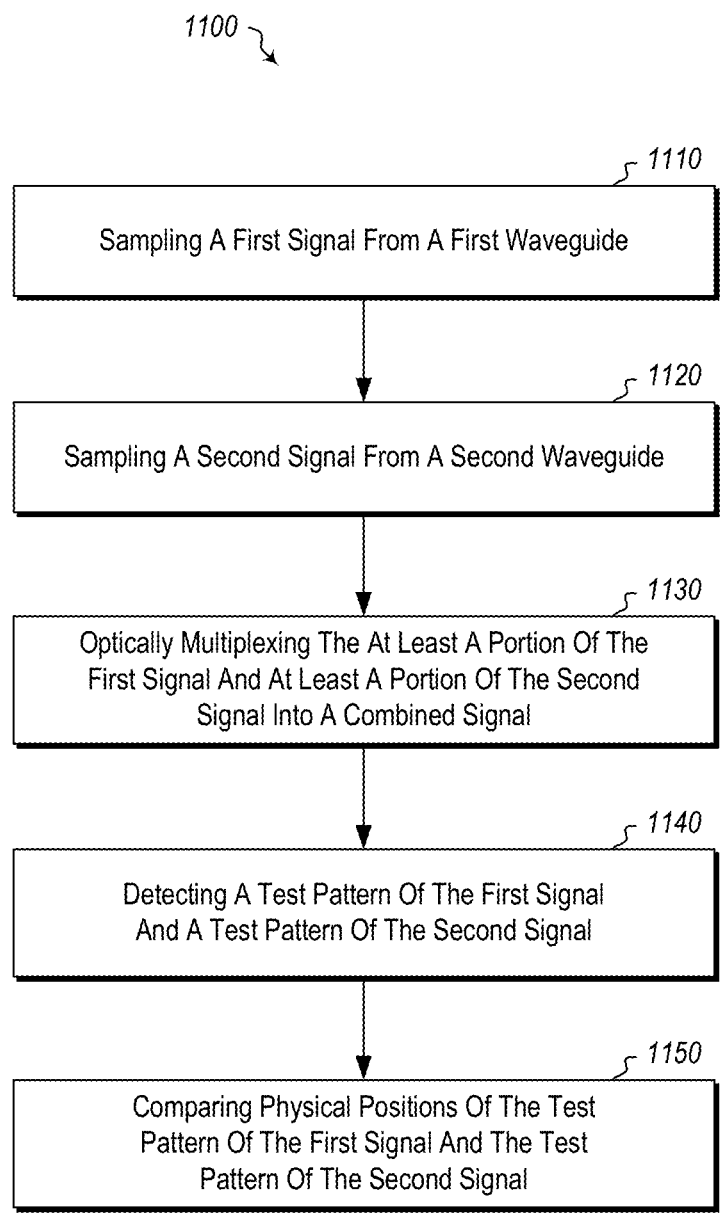
FIG. 11 is a flowchart illustrating an embodiment of a method of verifying alignment between a portion of a first signal and a portion of a second signal.

The flowchart 1100 of FIG. 11, for instance, reflects a method that includes sampling a first signal from a first waveguide (1110), sampling a second signal from a second waveguide (1120), and optically multiplexing at least a portion of the first signal and at least a portion of the second signal to create a combined optical signal (1130). The reflected method further includes detecting a test pattern of the first signal and a test pattern of the second signal (1140).

As described herein, the test pattern may be a test pattern imposed on the image frame, such as a test pattern 154-1 in an active region (as described in relation to FIG. 5) or a test pattern 154-3 in a border region (as described in relation to FIG. 6). In other embodiments, the test pattern is at least a portion of the active region, the border region, or the boundary between the active region and the border region within the sampling region, as described in relation to FIG. 4.

The method shown in FIG. 11 further includes comparing physical positions (i.e., coordinate values) of the test pattern of the first signal and the test pattern of the second signal (1050). In some embodiments, comparing the physical positions includes calculating a differential, such as a coordinate differential and/or a dimensional differential, described herein. In other embodiments, comparing the physical positions include determining wherein the test pattern of the first signal and the test pattern of the second signal are in the same physical position within the first signal and the second signal, respectively. For example, when the coordinate differential is within 0.1 mrad in the azimuth, elevation, roll, or combinations thereof and the dimensional differential is within 0.1 mrad in the azimuth, elevation, roll, or combinations thereof, the first signal and second signal may be aligned. When the first signal and the second signal are aligned, the display system may perform further acts to verify one or more other conditions of the display system.

Figure 12:
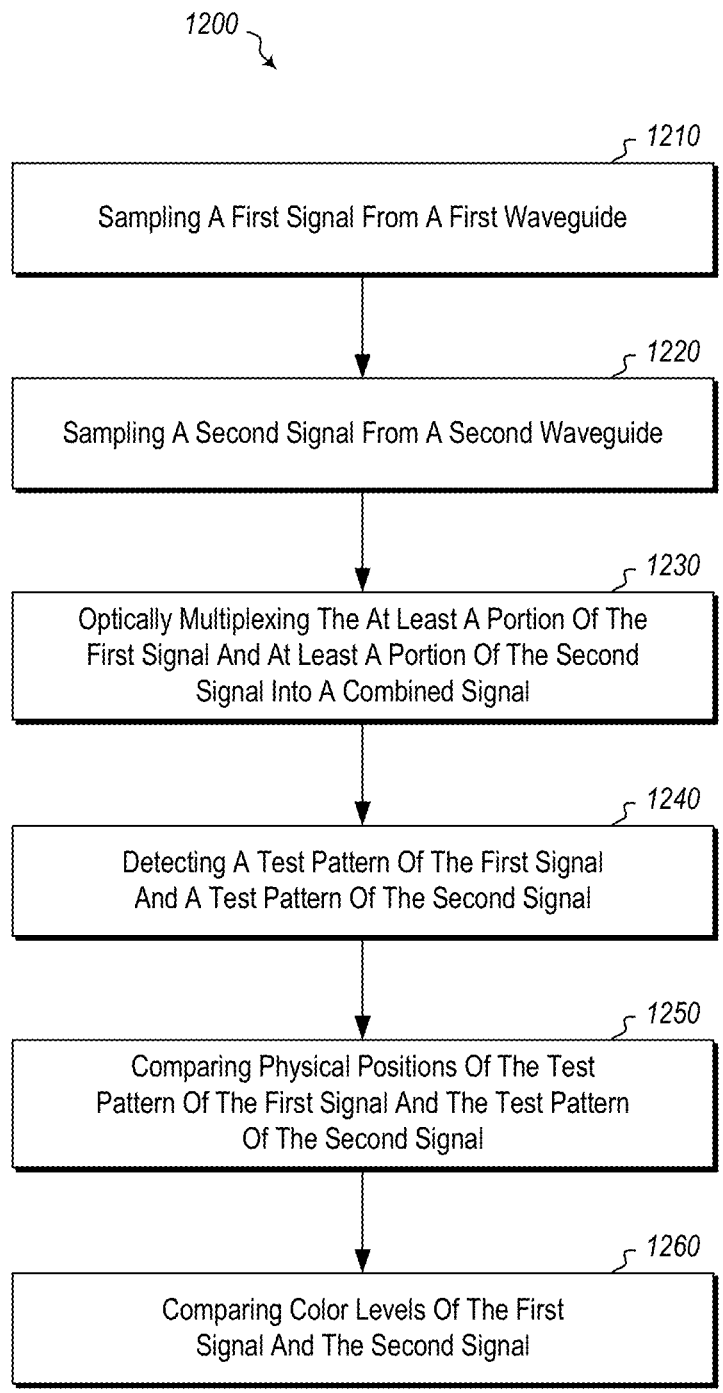
FIG. 12 is a flowchart illustrating an embodiment of a method of comparing color levels between a portion of a first signal and a portion of a second signal.

By way of example, as shown in FIG. 12, the display system may also evaluate one or more color values of the first signal and second signal. For example, the method illustrated by flowchart 1200, which also includes the acts of the flowchart 1100 of FIG. 11, further includes comparing color levels of the first signal and the second signal (1260).

In some embodiments, comparing color levels of the first signal and the second signal includes calculating a color spectrum of the first signal and the second signal. The color spectrum may be for a signal channel or a combination of channels of the first signal and the second signal. For example, the first signal and the second signal may be a series of color sequential frames in each of a different color channel. The first signal may consist of a red frame, a blue frame, and a green frame that are rendered in sequence, and a user may perceive the three color channels as a single image frame. In other examples, more than one color channel may be generated by a display pixel array simultaneously such that a single image frame includes more than one color channel. In yet other examples, the first signal and second signal may include a red frame, a blue frame, and a green frame that are rendered in sequence with the first DMA rendering a first color channel of the first signal and the second DMA rendering a second color channel (i.e., a different color from the first color channel) of the second signal. In such an example, the first signal and second signal are integrated over time to integrate an equivalent full-spectrum frame before comparing color levels of the first signal and the second signal.

In other embodiments, comparing color levels of the first signal and the second signal includes calculating a color spectrum and/or measuring a color uniformity of the test pattern extracted from the first signal and the test pattern extracted from the second signal. For example, the test pattern may have known color balances or a known color spectrum to allow the display system to more precisely compare the color balance and/or color uniformity of the first signal and the second signal. In at least one example, the test pattern includes at least a portion that is red, at least a portion that is blue, at least a portion that is green, and at least a portion that is yellow.

Figure 13:
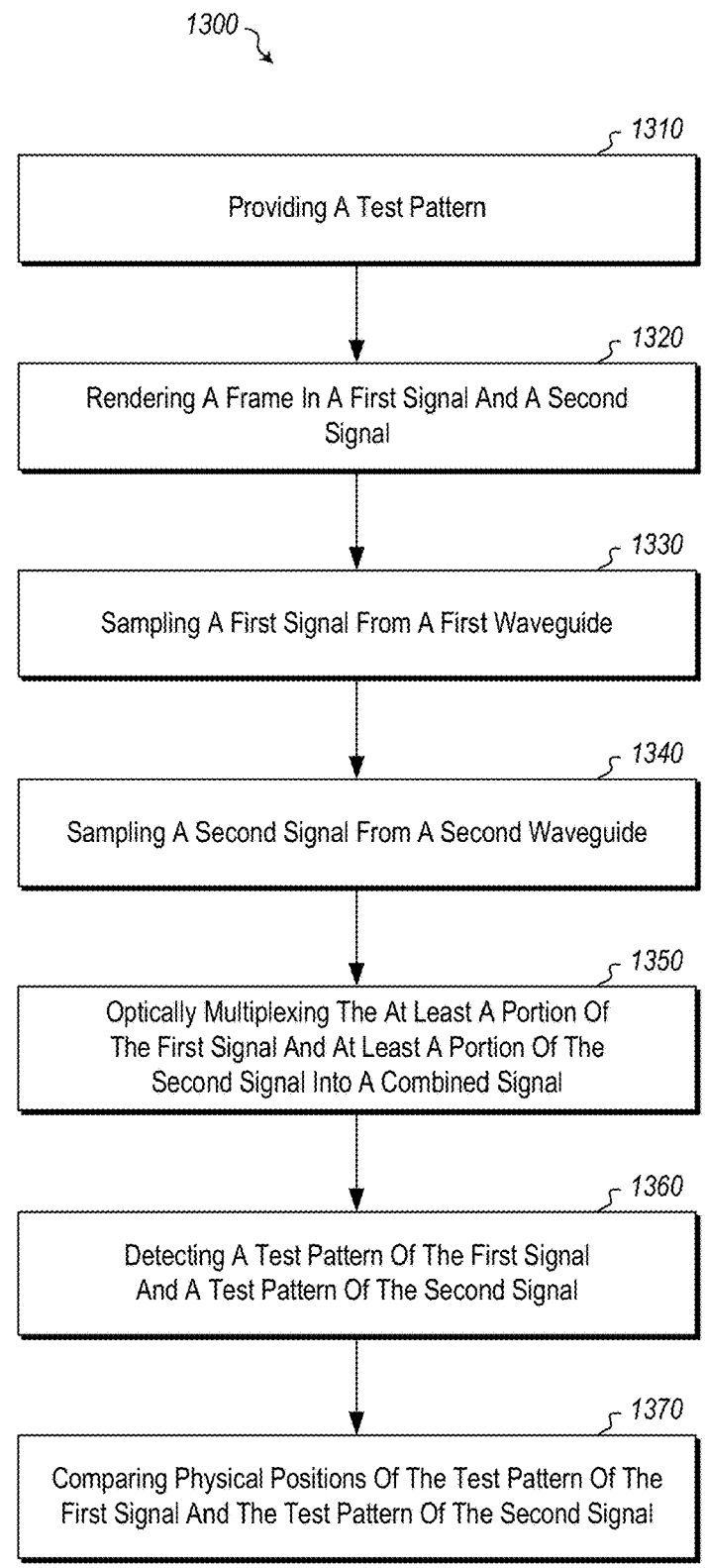
FIG. 13 is a flowchart illustrating an embodiment of a method of rendering test patterns in a portion of a first signal and a portion of a second signal.

FIG. 13 illustrates a flowchart 1300 depicts another method that includes acts of the flowchart 1100 described in relation to FIG. 11, as well as some additional acts. For instance, the method shown in the flowchart 1300 of FIG. 13 includes the acts of providing a test pattern (1310) and rendering an image frame in a first signal and a second signal (1320). Providing a test pattern includes accessing one or more stored test patterns stored in a storage device of the display system or detecting and selecting a portion of a provided image frame.

In some embodiments, providing a test pattern includes accessing a data storage device of the display system and incorporating the test pattern into the data provided to the first and/or second DMA (such as described in relation to FIGS. 10A and 10B). Providing the test pattern further includes positioning the test pattern within the image frame.

For example, the test pattern may be positioned in the active region, the border region, or a combination thereof.

The method also includes rendering the frame in a first signal and a second signal. For example, a frame of the first signal and a frame of the second signal may be rendered simultaneously with a test pattern in the first signal and the second signal. In other examples, as described in relation to FIG. 12, the first signal and second signal may include color sequential frames. The test frame in which the test pattern is rendered may be related to the color of the frame, and therefore, the test pattern may be rendered at a different time in the first signal than in the second signal. In such embodiments, the DAT may integrate a plurality of frames of the first signal and the second signal before detecting a test pattern of the first signal and a test pattern of the second signal.

The test pattern is provided or sampling region is selected at various times during usage of the display system. For example, a test pattern may be generated in an image frame at a time during usage that does not interrupt or alter the user's experience. In an example, the test pattern is startup logo or other image provided during a startup procedure. In another example, the test pattern is a system menu initiated by the user and that is overlaid on an image frame. The system menu may have known dimensions and location, allowing the display system to compare the physical location of one or more parts of the system menu in the first signal and the second signal. The system menu is also initiated by the user, allowing the display system to generate a test pattern without interrupting the user's experience in an unexpected manner.

In other embodiments, the test pattern is provided during an instant in which a user will not perceive the test pattern on the image frame. For example, the display system may provide the test pattern and/or render the test pattern in response to a trigger from the display system. The trigger may be a physical trigger or the trigger may be a visual trigger.

A physical trigger may include a trigger from an accelerometer, a gyroscope, another movement measurement device, or combinations thereof in the display system. For example, during rapid rotation of a user's head, the user's vision may temporarily be compromised or blurred. The display system can render or otherwise provide the test pattern in response to detecting a predetermined movement, such as the start of rotational acceleration of the head-mounted display, and render or otherwise provide the test pattern during the movement.

A visual trigger may include a trigger from an external camera or other machine vision of the display system. For example, sampling region of the first signal and the second signal sampled by the DAT, as described herein, includes the first signal and the second signal generated by the first DMA and second DMA, respectively, with little or no ambient light from the surrounding environment. In contrast, the user perceives the first signal and the second signal mixed with the ambient light by the first waveguide and the second waveguide.

In at least one embodiment, the display system may render or otherwise provide a test pattern that is visible to the DAT but not distinguishable from the environment surrounding the user. For example, the display system may render or otherwise provide a test pattern in a blue channel when the display system recognizes the user is looking at or the head-mounted display is oriented toward the sky. In other examples, the display system may render or otherwise provide a test pattern in a red channel when the display system recognizes the user is looking at or the head-mounted display is oriented toward a red surface, such as a red brick wall. In such embodiments, the test pattern is unique to within the first signal and the second signal generated by the first DMA and second DMA, respectively, while being imperceptible when viewed against the ambient environment.

Figure 14:
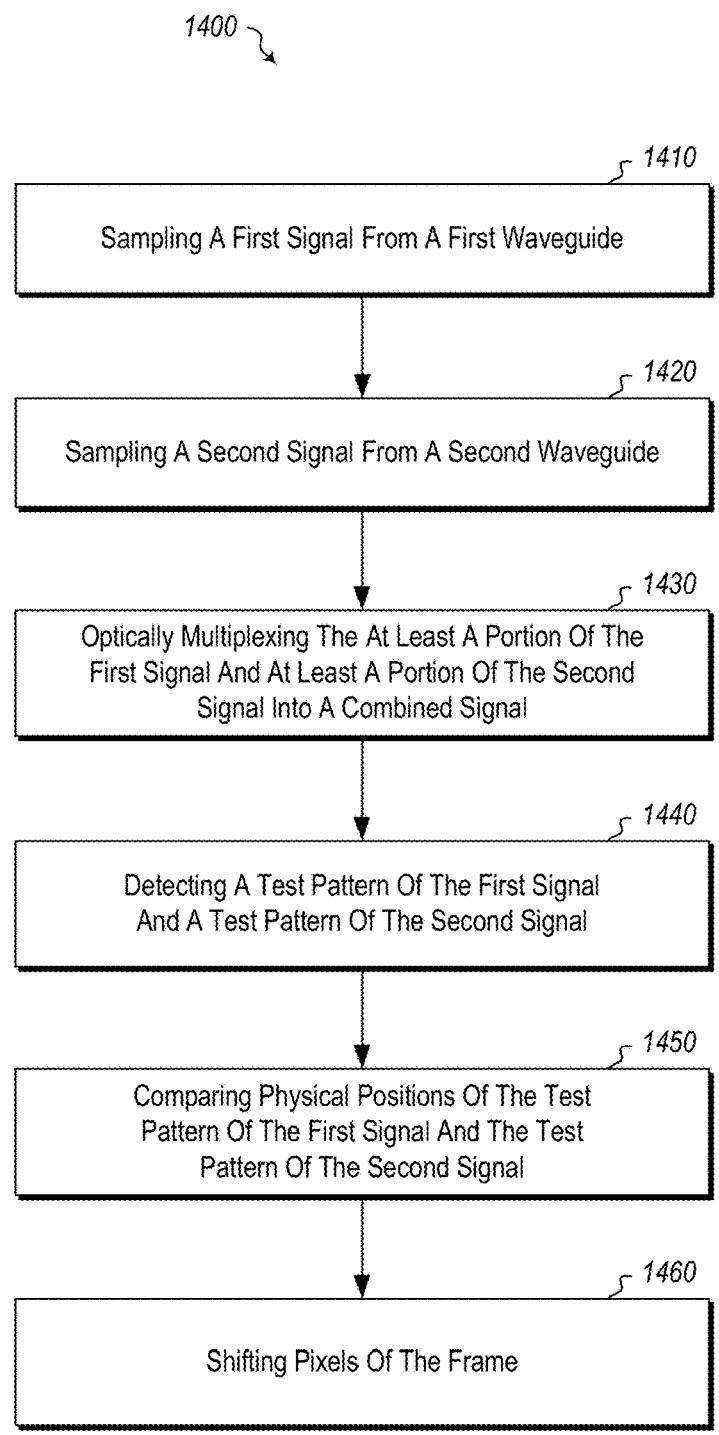
FIG. 14 is a flowchart illustrating an embodiment of a method of shifting pixels of a first signal relative to a second signal in response to calculating a differential.

Referring now to FIG. 14, a flowchart 1400 illustrates a method of calibrating the position of the first signal and the second signal. The flowchart 1400 includes the steps of the flowchart 1100 described in relation to FIG. 11 and the additional act of shifting pixels of the frame (1150). In some embodiments, shifting pixels of the frame includes adjusting data to the first DMA and/or second DMA to move the active region of the first signal and/or the second signal in the display pixel array. For example, the amount the active region of the first signal and/or the second signal is moved can be based at least partially upon the differential described in relation to FIG. 9.

In some embodiments, the differential may be less than a pixel. A subpixel shift may be perceptible to a user, and a subpixel shift may be implemented by shifting the intensity of neighboring pixels without shifting the entire image rendering by a full pixel. For example, a conventional head-mounted display or near-eye display may retain an alignment between a first waveguide or display and a second waveguide or display to within approximately 4 milliradian (mrad). For a user to perceive a single, integrated image from the head-mounted display or near-eye display, the first signal and second signal should be within 1.0 to 1.5 mrad.

In some embodiments, shifting pixels of the frame is performed in the computing components. In other embodiments, shifting pixels of the frame is performed in the ASIC. In yet other embodiments, shifting pixels of the frame is performed in the GPU.

In at least one embodiment, the display system may receive image frames from the SOC, the GPU, or the computing system of which the display system may be unable to view the content. For example, there may be digital copyright protections on certain video files that prevent one or more components of the display system from analyzing the content of particular frames. Therefore, at least a portion of the first signal and the second signal may be a predetermined signal. The display system has limited control over the rendering of the image frames of the predetermined signal. The display system may overlay visual information to the image frames of the predetermined signal while remaining agnostic to the content of the image frames.

Figure 15:
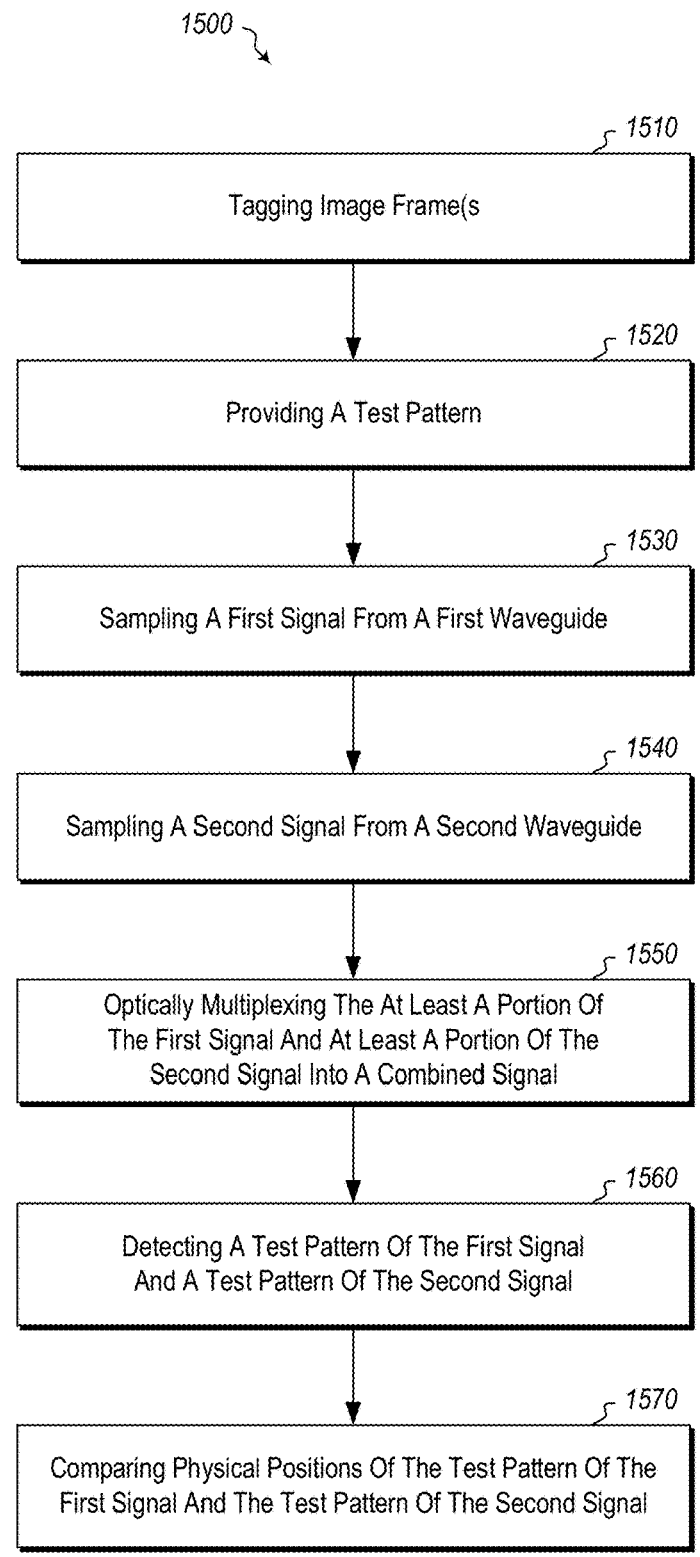
FIG. 15 is a flowchart illustrating an embodiment of a method of rendering a test pattern in a first signal and a second signal in response to a tagged image frame.

For example, FIG. 15 illustrates a flowchart 1500 of an embodiment of a method for calibrating a first signal relative to a second signal during display of a predetermined signal. The flowchart 1500 includes the acts of the flowchart 1100 described in relation to FIG. 11, while also including acts for providing a known test pattern. The method includes tagging image frames (1510) and providing a test pattern in response to detecting the tagged image frames (1520). For example, one or more image frames of the predetermined signal may be provided by the SOC and/or the GPU. At least one of the image frames is tagged by the ASIC and/or GPU in the metadata of the image frame before being sent to DMA.

The DMA reads the metadata of each image frame sent to the DMA to be rendered for the first signal and the second signal. When the DMA detects a tagged image frame in the metadata, the DMA provides a test pattern to the image frame when rendering the image frame in the first signal and the second signal.

In some embodiments, at least one of the image frames is tagged by the ASIC and/or GPU at periodic time intervals. For example, an image frame may be tagged every 1 second, every 10 seconds, every 1 minute, every 10 minutes, etc. to verify alignment of the first signal and second signal. In other embodiments, the image frame of the predetermined signal includes metadata that is recognized to tag the image frame. For example, during a video file, an image frame may include metadata indicating a chapter break in the video. The chapter break metadata can be used to tag the image frame. In other embodiments, the DMA may recognize the chapter break in the video as a tagged image frame.

In other embodiments, other metadata in the predetermined signal is used to tag one or more image frames. For example, the metadata for an image frame may include information regarding the color balance and/or spectrum of the image frame. The display system may provide a test pattern when the color balance of the image frame is within a threshold of a predetermined color balance and/or spectrum. For example, the display system may recognize a black frame from a color balance and/or spectrum in the metadata and tag that frame in the metadata.

Figure 16:
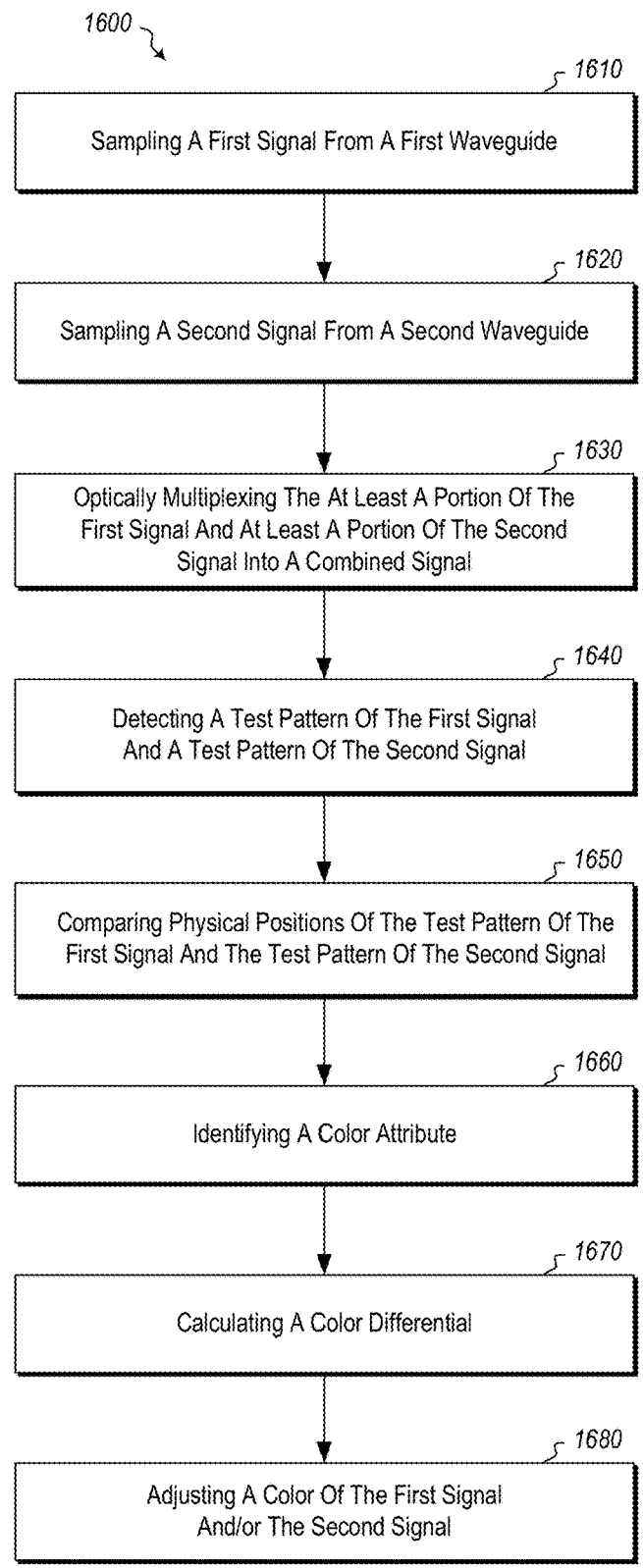
FIG. 16 is a flowchart illustrating an embodiment of a method of rendering a test pattern in a first signal and a second signal in response to a tagged image frame.

In further embodiments, a display system according to the present disclosure may evaluate similar portions of a first signal and a second signal to verify and adjust the color balance of the first signal and the second signal. FIG. 16 illustrates a flowchart 1600 of an embodiment of a method for adjusting the color of a first signal and/or a second signal. The flowchart 1600 includes the steps of the flowchart 1100 described in relation to FIG. 11 to verify the first signal and second signal are aligned before identifying a color attribute (1660) and calculating a color differential (1670). The color differential is then used in adjusting a color of the first signal and/or the second signal (1680).

In some embodiments, a color attribute is a percentage of a color spectrum in a color range. In other embodiments, a color attribute is a total intensity of the color spectrum. In yet other embodiment, a color attribute is a relative intensity of a first color channel to second color channel. In further embodiments, the color attribute is relative intensity of a first color in a first portion of the image frame to the same first color in a second portion of the image frame.

The color differential may be difference in the color attribute of the first signal and the second signal. In some embodiments, calculating the color differential is performed with a portion of the first signal and a portion of the second signal. In other embodiments, the color differential is calculated using the entire image frame of the first signal and the entire image frame of the second signal.

The color differential is then used in adjusting the color of the first signal and/or the second signal. For example, if the color differential indicates that the red saturation is 5% less in the first signal than in the second signal, the display system may increase the red saturation in the first DMA by 5% (e.g., by increasing the drive current of an LED array and/or a display pixel array) to balance the color attributes of the first signal and the second signal.

Figure 17:
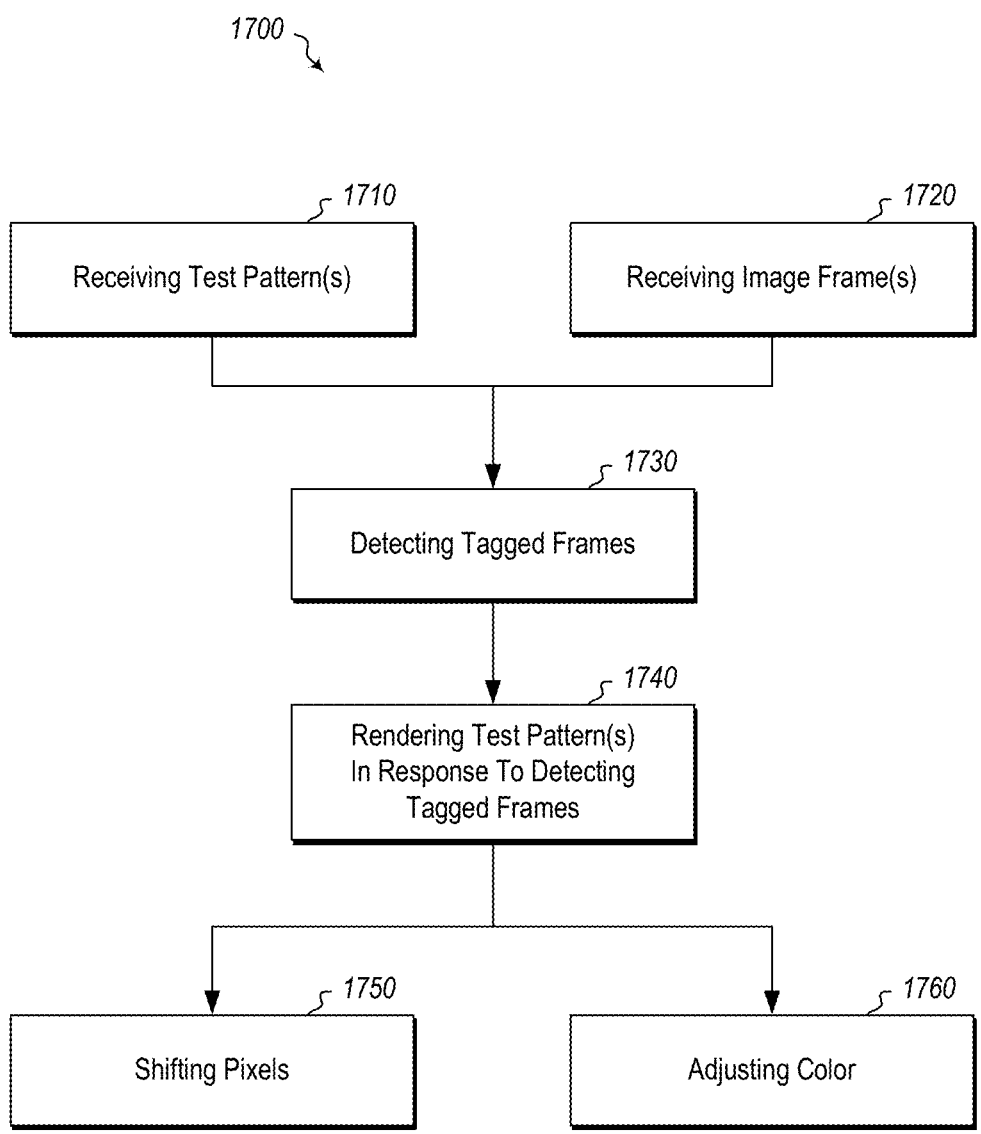
FIG. 17 is a flowchart illustrating an embodiment of a method of a DMA concurrently adjusting position and color balance of a first signal relative to a second signal.

In at least one embodiment, a display system may verify and/or correct for both image displacement and color imbalances substantially concurrently. For example, FIG. 17 is a flowchart 1700 of a method that may be performed by the DMA. The method includes receiving test pattern(s) (1710) and/or receiving image frame(s) (1720). In some embodiments, the DMA receives a plurality of test patterns that may be implemented in different situations.

For example, the method further includes detecting tagged frames (1730) and rendering (1740) test pattern(s) in response to detecting tagged frames with predetermined metadata. As described herein, the predetermined metadata may be metadata native to the image frame(s) or the predetermined metadata may be a tag that is written into the metadata by the display system. In some embodiments, the DMA renders different test patterns in different locations within the signal in response to various triggers. For example, the DMA may render a test pattern in the blue channel in response to a visual trigger, as described herein, or render a test pattern in the active region in response to a predetermined movement.

The test patterns rendered in the first signal and the second signal may be sampled and compared by the DAT, as described herein, and one or more differentials are provided to the DMA. The one or more differentials, such as a coordinate differential, a dimensional differential, a color differential, or other differentials, are used by the DMA in shifting pixels (1750) and/or adjusting (1760) color attributes of the first signal and/or second signal.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein is combinable with any element of any other embodiment described herein, unless such features are described as, or by their nature are, mutually exclusive.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value. Where ranges are described in combination with a set of potential lower or upper values, each value may be used in an open-ended range (e.g., at least 50%, up to 50%), as a single value, or two values may be combined to define a range (e.g., between 50% and 75%).

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for rendering optical signals on a head-mounted display, the system comprising:
   a first waveguide configured to guide a first signal therethrough, wherein the first waveguide has a first planar output surface that is arranged to face a user's first eye when the system is operated;
   a second waveguide configured to guide a second signal therethrough, wherein the second waveguide has a second planar output surface that is arranged to face the user's second eye when the system is operated;
   an optical multiplexer in optical communication with the first waveguide and the second waveguide, the optical multiplexer being positioned between the user's first and second eyes and the first and second planar output surfaces, wherein the optical multiplexer is configured to combine at least a portion of the first signal and at least a portion of the second signal; and
   an optical sensor in optical communication with the optical multiplexer and configured to receive a combined optical signal including at least a portion of the first signal and at least a portion of the second signal.

2. The system of claim 1, wherein the first signal includes at least three optical channels.

3. The system of claim 1, wherein the optical multiplexer is configured to combine all of the first signal and all of the second signal.

4. The system of claim 1, wherein the first signal and the second signal include a test pattern.

5. The system of claim 1, wherein the optical multiplexer is a prism assembly.

6. The system of claim 1, wherein the first waveguide is mounted to a first side of the head-mounted display and the second waveguide is mounted to a second side of the head-mounted display.

7. The system of claim 6, wherein the optical multiplexer is physically mounted to the first and second planar output surfaces of the first and second waveguides.

8. A system for rendering optical signals on a head-mounted display, the system comprising:
- a first waveguide configured to guide a first signal therethrough, wherein the first waveguide has a first planar output surface that is arranged to face a user's first eye when the system is operated;
- a second waveguide configured to guide a second signal therethrough, wherein the second waveguide has a second planar output surface that is arranged to face the user's second eye when the system is operated;
- an optical multiplexer in optical communication with the first waveguide and the second waveguide, the optical multiplexer configured to combine at least a portion of the first signal and at least a portion of the second signal;
- a first diffractive optical element positioned between the first planar output surface of the first waveguide and the optical multiplexer;
- a second diffractive optical element positioned between the second planar output surface of the second waveguide and the optical multiplexer; and
- an optical sensor in optical communication with the optical multiplexer and configured to receive a combined optical signal including at least a portion of the first signal and at least a portion of the second signal.

9. The system of claim 8, wherein the first signal includes at least three optical channels.

10. The system of claim 8, wherein the optical multiplexer is configured to combine all of the first signal and all of the second signal.

11. The system of claim 8, wherein the first signal and the second signal include a test pattern.

12. The system of claim 8, wherein the optical multiplexer is a prism assembly.

* * * * *